United States Patent
Beaulieu

(10) Patent No.: US 11,512,636 B2
(45) Date of Patent: Nov. 29, 2022

(54) LUBRICANT FILLER ASSEMBLY

(71) Applicant: PRATT & WHITNEY CANADA CORP., Longueuil (CA)

(72) Inventor: Rose Beaulieu, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 365 days.

(21) Appl. No.: 16/774,214

(22) Filed: Jan. 28, 2020

(65) Prior Publication Data

US 2021/0231055 A1 Jul. 29, 2021

(51) Int. Cl.
*F02C 7/06* (2006.01)
*F16N 23/00* (2006.01)
*F16N 29/02* (2006.01)

(52) U.S. Cl.
CPC .............. *F02C 7/06* (2013.01); *F16N 23/00* (2013.01); *F16N 29/02* (2013.01); *F05D 2260/98* (2013.01); *F16N 2210/08* (2013.01); *F16N 2250/18* (2013.01); *F16N 2270/10* (2013.01); *F16N 2280/00* (2013.01)

(58) Field of Classification Search
CPC . F01M 11/04; F02C 7/06; F16N 23/00; F16N 29/02; F16N 2280/00; F16N 2270/10; F16N 2210/08; B65D 47/00; B65B 3/04; F01D 25/18
USPC ........... 141/374, 326; 184/14; 137/442, 151, 137/217, 585
See application file for complete search history.

(56) References Cited

U.S. PATENT DOCUMENTS

| 4,708,674 | A | * | 11/1987 | Matsumoto | ........... F02B 61/045 440/88 L |
| 5,022,495 | A | * | 6/1991 | Lavender | ............... F01M 11/04 184/105.1 |
| 5,141,019 | A | | 8/1992 | LeBlanc | |
| 6,105,617 | A | * | 8/2000 | Spriegel | .................. F16K 15/00 137/278 |

(Continued)

FOREIGN PATENT DOCUMENTS

GB 2275775 9/1994

*Primary Examiner* — Michael R Mansen
*Assistant Examiner* — Mark K Buse
(74) *Attorney, Agent, or Firm* — Norton Rose Fulbright Canada LLP

(57) ABSTRACT

A lubricant filler for a lubricant tank of an aircraft engine comprises a filler tube having an upper portion to be disposed outside the volume of the tank and a lower portion to be disposed inside the volume. First and second openings are respectively provided in the upper and lower portions. An oil volume sensor is received in the filler tube through the first opening. A valve is connected to the filler tube and movable between an open position in which the valve provides a fluid connection into the lower portion via the second opening, and a closed position in which the valve blocks the fluid connection into the lower portion via the second opening. A third opening, smaller than both the first and second openings, defined one of: a) through a sidewall of the lower portion of the filler tube to provide a fluid connection between the volume and the lower portion when the lubricant filler assembly is attached to the lubricant tank, and b) through the valve to provide the fluid connection when the lubricant filler assembly is attached to the lubricant tank.

17 Claims, 8 Drawing Sheets

(56) References Cited

U.S. PATENT DOCUMENTS

| | | | | |
|---|---|---|---|---|
| 6,874,528 | B2* | 4/2005 | Kozik | F16K 1/385 137/446 |
| 7,089,974 | B2* | 8/2006 | Stuart | F16K 31/521 137/434 |
| 2004/0065512 | A1* | 4/2004 | Gates | F01M 11/12 184/88.1 |
| 2007/0193650 | A1* | 8/2007 | Annati | B60K 15/00 141/83 |
| 2009/0101230 | A1* | 4/2009 | Anstead | F01D 25/18 220/86.1 |
| 2010/0096038 | A1* | 4/2010 | Burris | F16K 23/00 141/311 A |
| 2017/0267411 | A1* | 9/2017 | Beier | B65D 25/56 |
| 2021/0003051 | A1* | 1/2021 | Daniel | F01M 11/04 |

\* cited by examiner

LUBRICANT FILLER ASSEMBLY

TECHNICAL FIELD

The application relates assemblies for filling aircraft lubricant tanks with lubricant.

BACKGROUND OF THE ART

Prior art assemblies for filling aircraft lubricant tanks with lubricant are suitable for their intended purposes. However, improvements in the aerospace field are always desirable.

SUMMARY

In one aspect, there is provided a lubricant filler assembly for a lubricant tank for an aircraft engine, the lubricant tank having a volume, the lubricant filler assembly comprising: a filler tube having an upper portion to be disposed outside the volume when the lubricant filler assembly is attached to the lubricant tank, a lower portion to be disposed inside the volume when the lubricant filler assembly is attached to the lubricant tank, a first opening in the upper portion, and a second opening in the lower portion; an oil volume sensor removably received in the filler tube through the first opening in an in-use position and extending into the lower portion while in the in-use position; a valve operatively connected to the filler tube and movable between an open position in which the valve provides a fluid connection into the lower portion via the second opening, and a closed position in which the valve blocks the fluid connection into the lower portion via the second opening; a third opening, the third opening being smaller than both the first opening and the second opening and defined one of: a) through a sidewall of the lower portion of the filler tube to provide a fluid connection between the volume and the lower portion when the lubricant filler assembly is attached to the lubricant tank, and b) through the valve to provide the fluid connection when the lubricant filler assembly is attached to the lubricant tank.

In another aspect, there is provided a lubricant tank for an aircraft, comprising: a wall defining at least part of a volume of the lubricant tank, the volume being associated with a design filled level and a design empty level; a fluid connection into the volume; a filler tube having an open top end portion disposed outside of the volume and accessible from outside of the lubricant tank, and a lower portion disposed inside the volume and extending below the design empty level when the lubricant tank is in an upright reference position, the filler tube having a larger opening and a smaller opening in the lower portion; an oil volume sensor removably received in an in-use position in the lower portion through the open top end portion and having a lubricant level test zone extending between the design filled level and the design empty level while the oil volume sensor is in the in-use position; and a normally-closed valve operatively connected to the filler tube and movable between an open position in which the valve exposes at least part of the larger opening and a closed position in which the valve blocks the larger opening.

DESCRIPTION OF THE DRAWINGS

Reference is now made to the accompanying figures in which.

DETAILED DESCRIPTION

Figure 1:
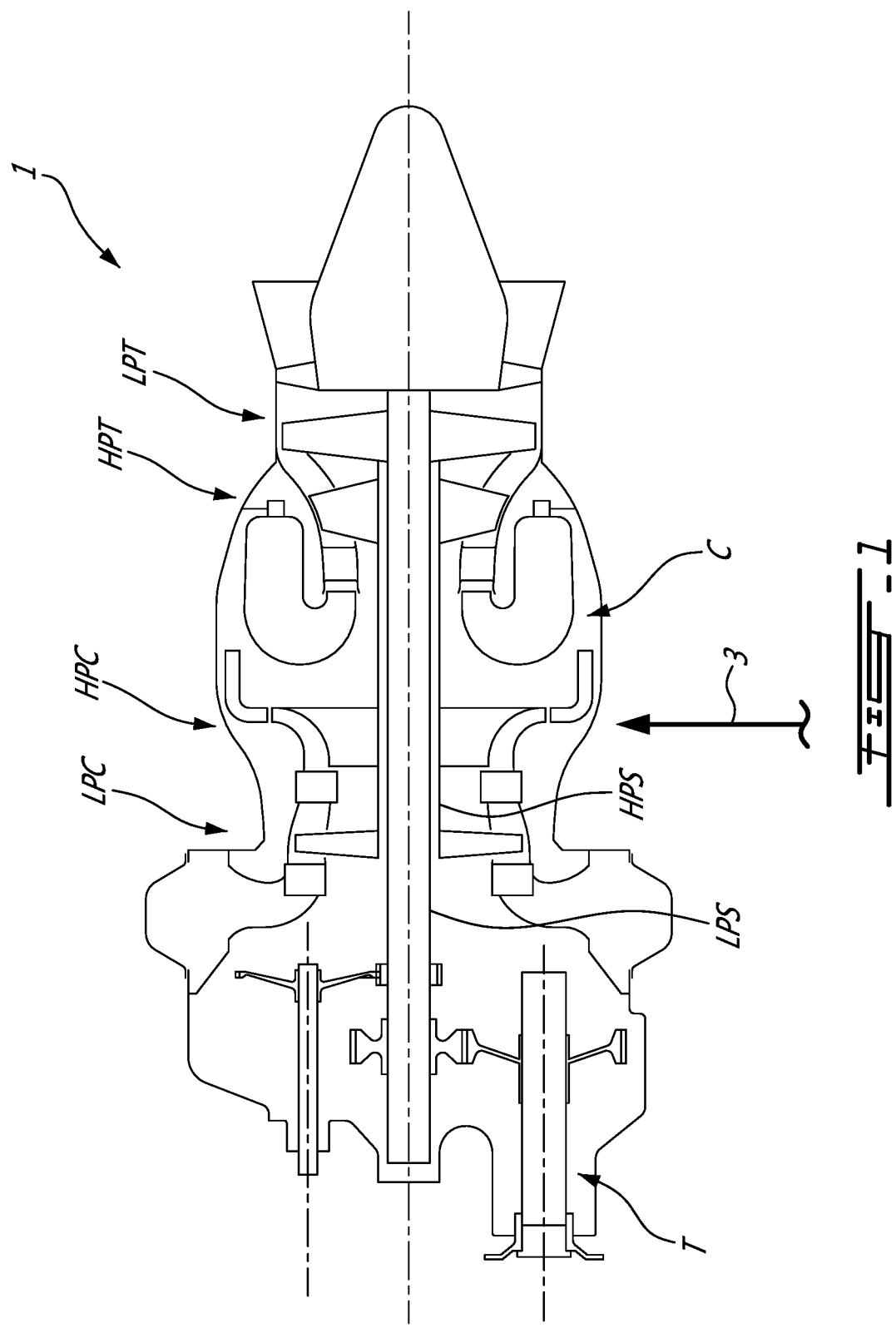
FIG. 1 is a schematic cross sectional view of a gas turbine engine.

FIG. 1 illustrates an aircraft engine 1, which may be part of an aircraft, such as a conventional aircraft for example. In this example, the engine 1 is a turboshaft engine 1, but could be any other type of aircraft engine, including but not limited to a turboprop engine, turbofan engine, and a compounded engine having a Wankel engine. The present embodiment of the engine 1 includes, in serial flow communication, a low pressure compressor section (LPC) and a high pressure compressor section (HPC) for pressurizing air, a combustor (C) in which the compressed air is mixed with fuel and ignited for generating an annular stream of hot combustion gases, a high pressure turbine section (HPT), and a lower pressure turbine section (LPT). The respective pairs of the compressor and turbine sections are interconnected via respective independently rotatable low pressure and high pressure spools (LPS), (HPS). The engine 1 includes a transmission (T) (e.g. a gearbox) driven by the low pressure turbine section (LPT) for outputting motive power to an aircraft.

Figure 2:
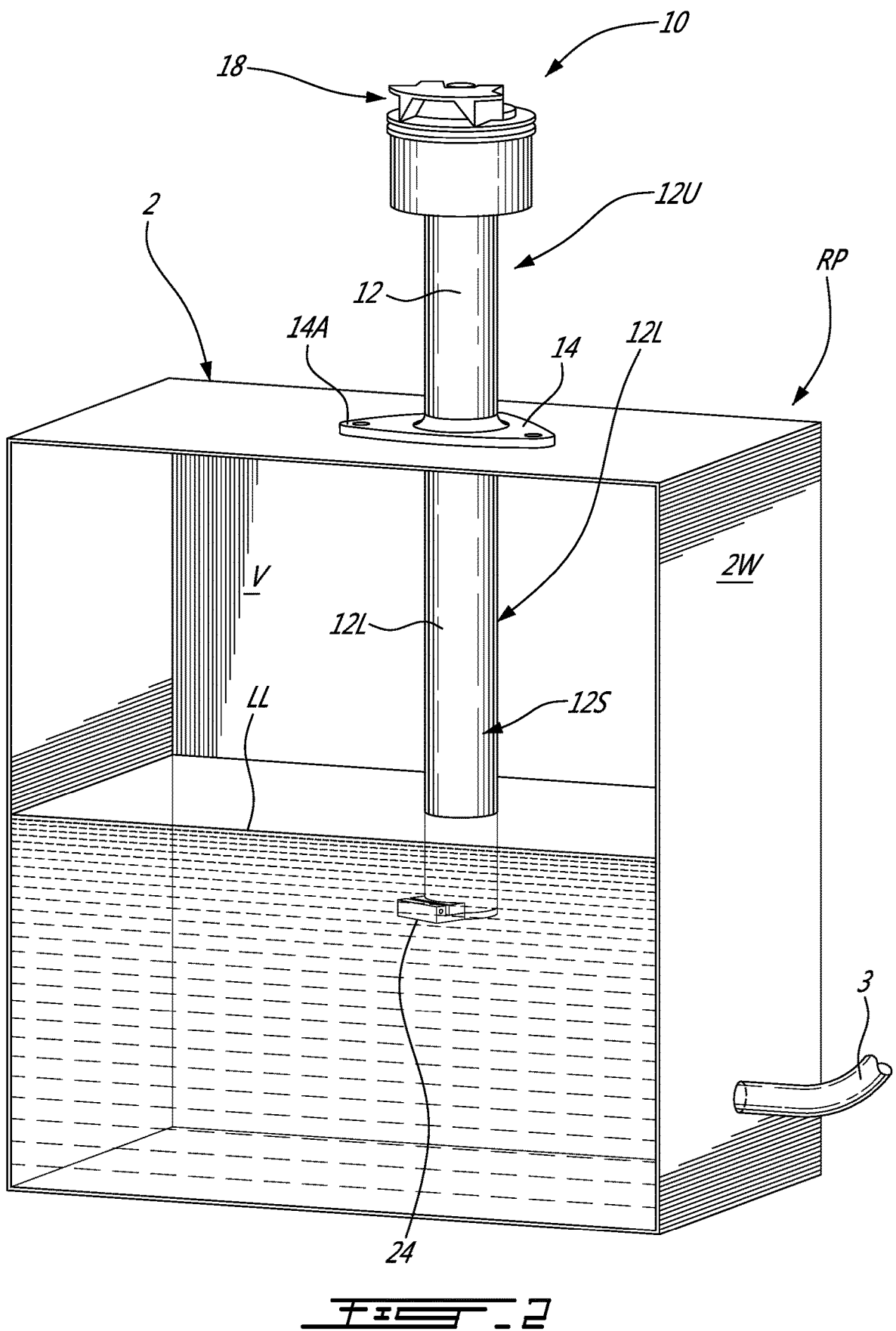
FIG. 2 is a schematic partially-cut-away perspective view of a lubricant tank and lubricant filler assembly associated with the gas turbine engine of FIG. 1, the lubricant filler assembly including a flapper valve.

FIG. 2 illustrates a lubricant tank 2 for an aircraft engine, such as the engine 1. For the purposes of this description, the lubricant tank 2 is shown in an upright reference position (RP). Hence, the upright reference position (RP) needs not necessarily correspond to an upright in-use position in which the lubricant tank 2 may be when the engine 1 and aircraft with which the engine 1 may be used are on flat horizontal terrain. The lubricant tank 2 may be configured for any position/installation with respect to the engine 1 selected to suit each particular application of the lubricant tank 2 and the engine 1. When in use, the lubricant tank 2 may be, for example, part of a lubrication system of the engine 1 and may be connected to the lubrication system via a fluid connection 3. The lubrication system and the fluid connection 3 may be conventional, and the lubricant may be for example oil. Accordingly, these aspects of the lubricant tank 1 and lubrication system are not shown or described in detail. As a non-limiting example, the lubrication system and the fluid connection 3 may be defined by one or more fluid lines and/or passages, one or more connectors, one or more pump(s), filter(s), and/or other parts, respectively, as may be necessary for each particular application.

Figure 3:
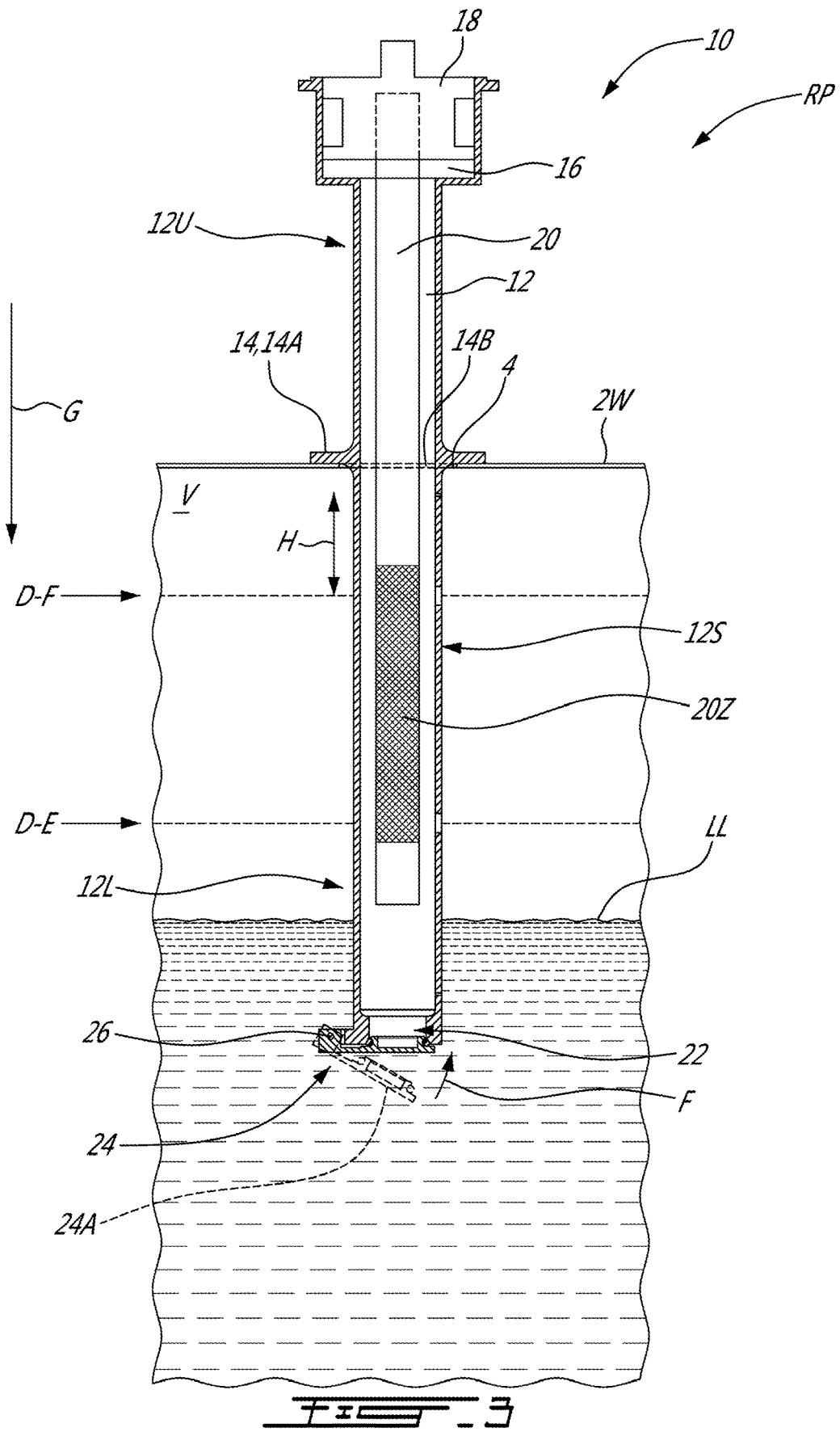
FIG. 3 is a schematic section view of the lubricant filler assembly and the lubricant tank of FIG. 2.

Still referring to FIG. 2, the lubricant tank 2 includes a wall 2W that defines at least part of a volume (V) of the lubricant tank 2. The volume (V) contains lubricant, such as oil, when the lubricant tank 2 is in use. The wall 2W may have any suitable construction, such as unitary or multiple-part construction. As shown in FIG. 3, the volume (V) has a design filled level (D-F) and a design empty level (D-E) associated with the volume (V). These fill levels (D-F), (D-E) may be selected to suit each particular embodiment and application of the lubricant tank 2 and the engine(s) 1 with which the lubricant tank 2 may be used, based on any suitable engineering methods, such as for example conventional engineering methods applicable in the art. As shown, the design filled level (D-F) is below a top of the volume (V) of the lubricant tank 2 and the design empty level (D-E) is above a bottom of the volume (V) of the lubricant tank 2.

Referring concurrently to FIGS. 2 and 3, the wall 2W defines an aperture 4 (FIG. 3) therethrough, and more particularly in this non-limiting embodiment in a top surface of the lubricant tank 2. A lubricant filler assembly 10 is received in part into the volume (V) of the lubricant tank 2 through the aperture 4. The lubricant filler assembly 10 includes a filler tube 12 that extends in a sealed relation through the wall 2W into the volume (V), and more particularly through the aperture 4 in this embodiment. The filler tube 12 includes a securement feature 14 which sealingly connects and positions the filler tube 12 relative to the wall 2W. As shown in FIG. 3, to this end the securement feature 14 includes an abutment 14A that extends radially outward from an outer surface of the filler tube 12, and thread 14B which threads into a corresponding thread (shown but not labeled to maintain clarity) in the surface of the wall 2W that defines the aperture 4. In other embodiments, other securement feature(s) may be used instead of or in addition to the securement feature 14.

The interface between the filler tube 12 and the wall 2W may be further sealed with one or more suitable seals and/or sealing materials. In other embodiments, the filler tube 12 may be manufactured integral with the wall 2W, for example using suitable additive manufacturing. In such embodiments, the filler tube 12 may extend through the wall 2W in the sealed relation without a need for any sealing arrangement such as threaded engagement, seal(s), sealing material(s) or the like.

Still referring to FIGS. 2 and 3, the filler tube 12 has an upper portion 12U and a lower portion 12L. In this embodiment, the upper portion 12U is disposed on an outer side of the wall 2W and defines a filling opening 16 (FIG. 4) in a top end of the filler tube 12. A cap 18 is removably engaged to the top end of the filler tube 12, and more particularly the top end of the upper portion 12U in this non-limiting embodiment, and seals the filling opening 16. The cap 18 may have any suitable construction, such as conventional construction. An oil level sensor, such as a dipstick 20, is attached to the cap 18. As shown, the dipstick 20 is removably received in the filler tube 12 through the filling opening 16 and is in an in-use position when the cap 18 is in its closed/removably engaged position. When the dipstick 20 is in the in-use position, dipstick 20 extends into the lower portion 12L of the filler tube 12.

As shown in FIG. 3, in this embodiment the dipstick 20 has a lubricant level test zone 20Z, which for example may be defined and/or delineated by a mesh of protrusions and/or grooves. As shown schematically in FIG. 3, but not labeled to maintain clarity, the lubricant level test zone 20Z may include a visual marker that aligns with (e.g. by being at least proximate to) the design filled level (D-F) and visual marker that aligns with (e.g. by being at least proximate to) the design empty level (D-E). In the present embodiment, when the dipstick 20 is in the in-use position, the lubricant level test zone 20Z extends between the design filled level (D-F) and the design empty level (D-E), as well as above the design filled level (D-F) and below the design empty level (D-E).

In the present embodiment, the visual markers may be provided by respective grooves and/or protrusions which may be visually distinguishable to human eyes from a rest of the lubricant level test zone 20Z. In other embodiments, the visual markers may be defined by respective upper and lower edges of the lubricant level test zone 20Z. In some such cases, the lubricant level test zone 20Z may extend between but not necessarily past the respective ones of the design filled level (D-F) and below the design empty level (D-E). In a particular embodiment, the top edge of the lubricant level test zone 20Z may align with the design filled level (D-F) of the volume (V) and the bottom edge of the lubricant level test zone 20Z may align with the design empty level (D-E) when the dipstick 20 is in the in-use position. Other configurations of the lubricant level test zone 20Z that may allow maintenance personnel to read lubricant level in the volume (V) by viewing the lubricant level from the lubricant level test zone 20Z are likewise contemplated.

Referring to FIG. 3, the lower portion 12L of the filler tube 12 defines a lubricant transfer opening 22 in the lower portion 12L. In this embodiment, the lubricant transfer opening 22 is defined in the bottom end of the lower portion 12L. As an example, the lubricant transfer opening 22 in other embodiments may be defined in a sidewall 12S of the filler tube 12 instead of the bottom end of the filler tube 12. A valve 24 is attached to the filler tube 12 and is operable: a) to allow passage of lubricant out of a part of the filler tube 12 that is upstream of the lubricant transfer opening 22 through the lubricant transfer opening 22 and into the volume (V), and b) to block passage of lubricant from the volume (V) into the part of the filler tube 12 upstream of the lubricant transfer opening 22 through the lubricant transfer opening 22. Accordingly, the valve 24 is said to be a one-way valve. Other embodiments of valve 24 are likewise contemplated, so long as such other valves provide the functionality as described herein.

In the present non-limiting embodiment, the valve 24 is movable between: a) an open position 24A in which the valve 24 allows passage of lubricant through the lubricant transfer opening 22, and b) a closed position 24B (FIGS. 5, 6) in which the valve 24 blocks passage of lubricant through the lubricant transfer opening 22. Also in the present non-limiting embodiment, the valve 24 is biased to the closed position 24B, for example via a suitable spring 26 or other biasing assembly, with a biasing force (F). In this non-limiting embodiment, the valve 24 is a flapper valve 24 pivotably connected to the lower portion 12L of the filler tube 12, and accordingly the biasing force (F) may be a torque about the pivot point of the flapper valve 24. In such embodiments, the biasing force (F) may be a linear force. As shown in FIG. 2, in some such embodiments, the check valve may be at least in part received in the filler tube 12. Yet other types of valve are contemplated, such as valve(s)

having a different number of parts, and/or actively-actuated valve(s) for example, so long as the functionality described herein is provided.

Figure 4:
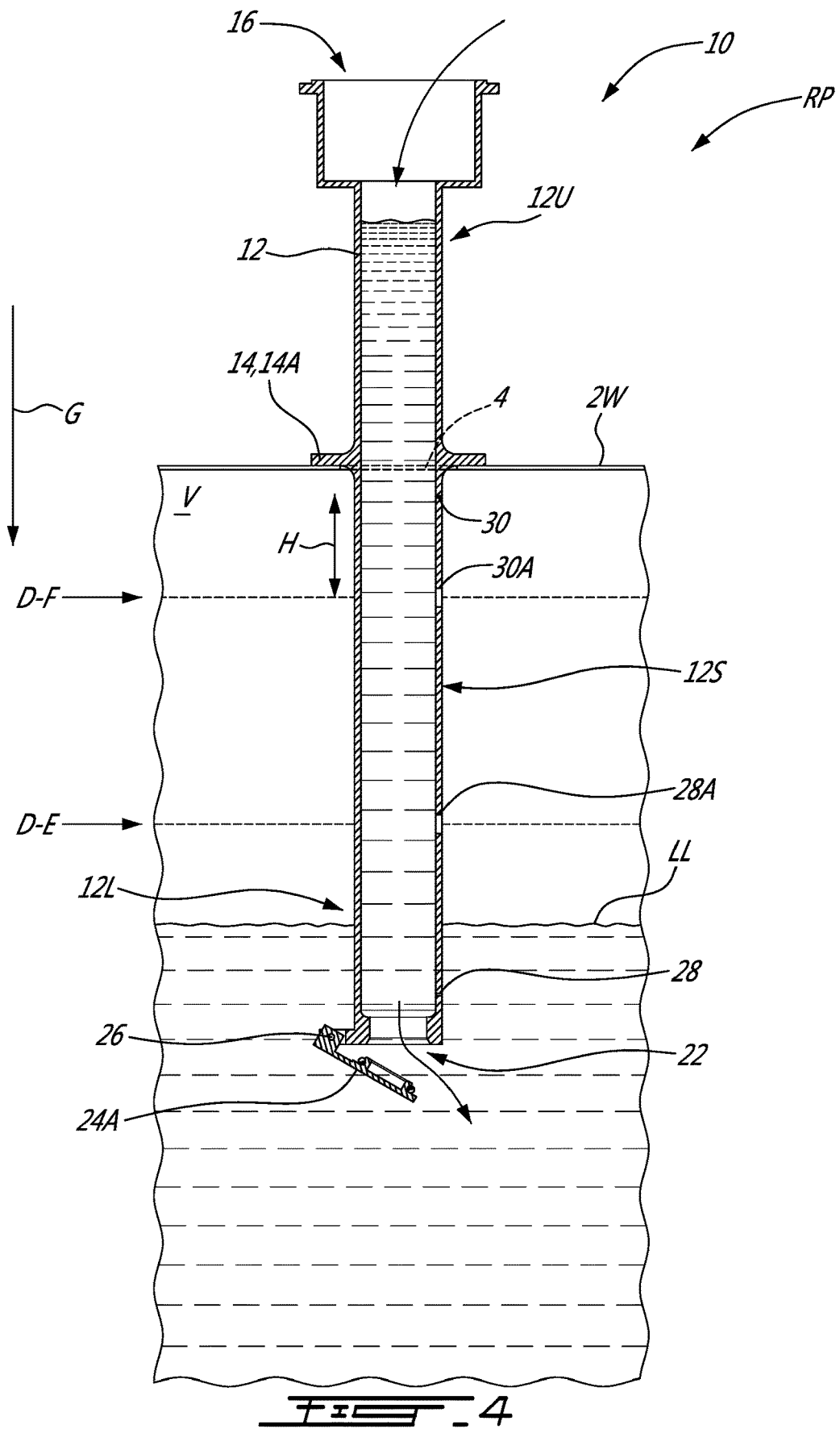
FIG. 4 is a schematic section view of the lubricant filler assembly and the lubricant tank of FIG. 3, with a cap and dipstick of the lubricant filler assembly removed, lubricant being poured into a filler tube of the lubricant filler assembly, and lubricant level in the lubricant tank being at a first level.
Figure 5:
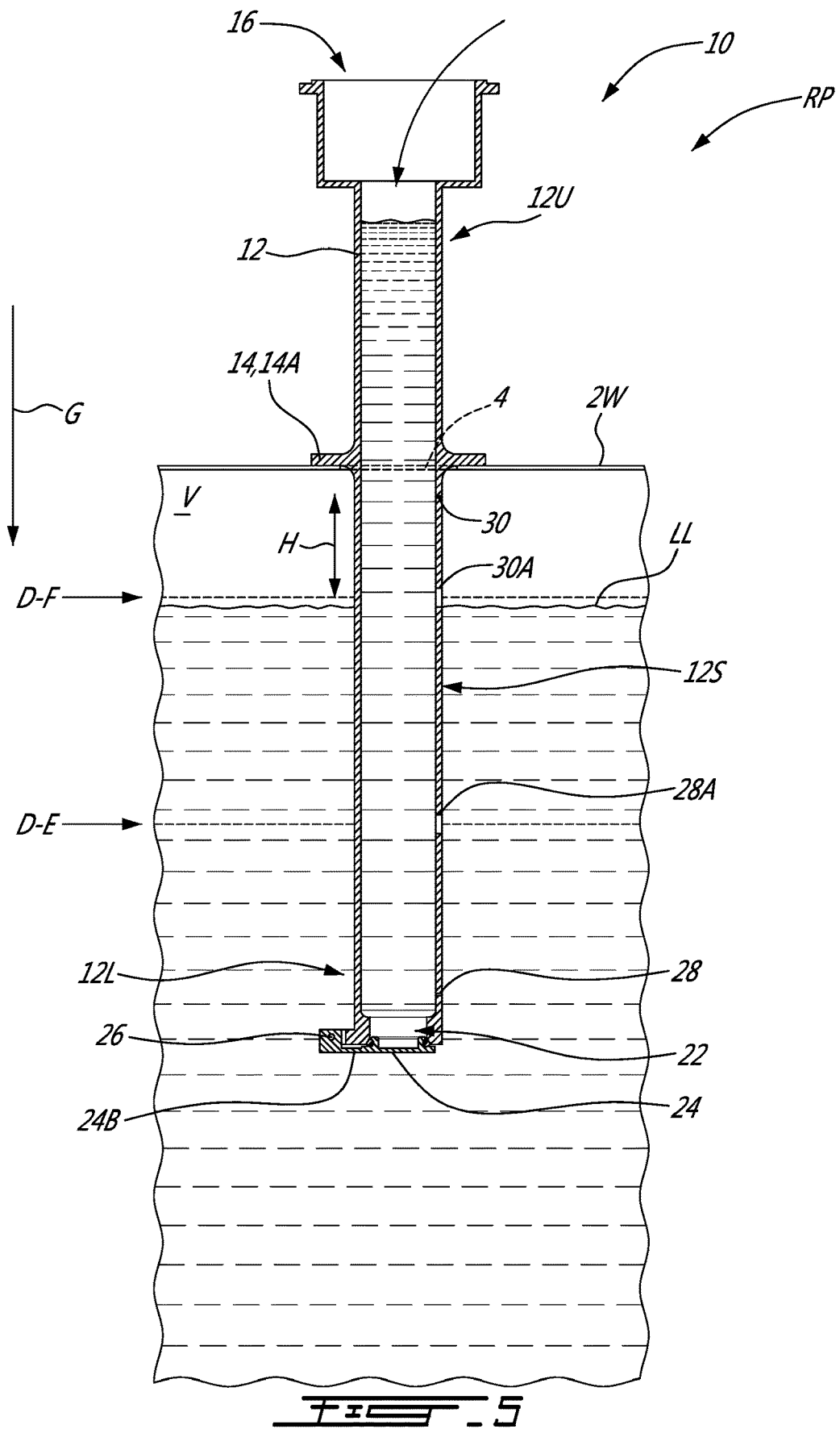
FIG. 5 is a schematic section view of the lubricant filler assembly and the lubricant tank of FIG. 3, with the cap and dipstick removed, lubricant being poured into the filler tube, and lubricant level in the lubricant tank being at a second level.
Figure 6:
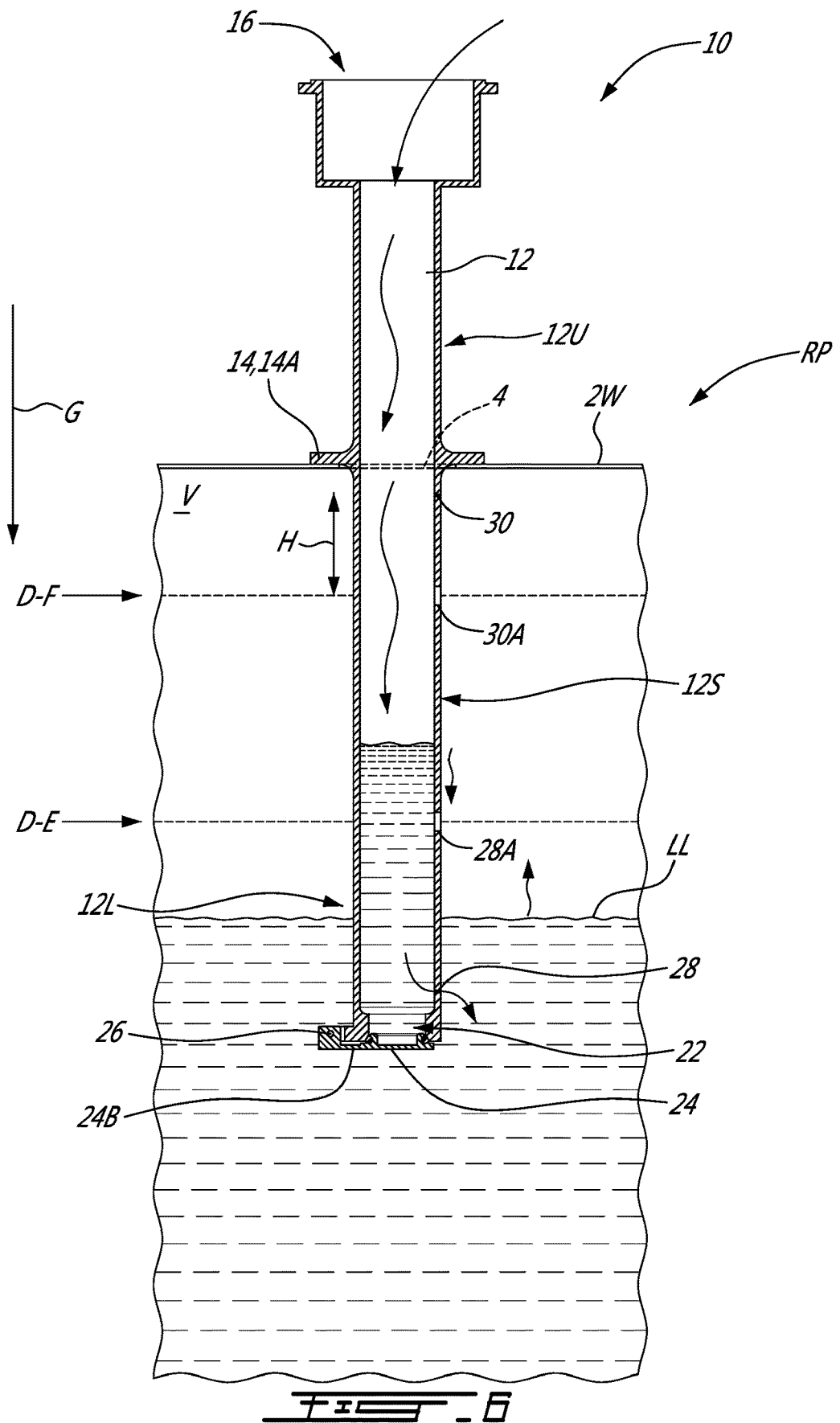
FIG. 6 is a schematic section view of the lubricant filler assembly and the lubricant tank of FIG. 3, with the cap and dipstick removed, lubricant being poured into the filler tube, and lubricant level in the lubricant tank being at a third level.

Referring now to FIGS. 4 and 5, a height (H) of the filler tube 12 extending above the design filled level (D-F) provides a head (i.e. column) of lubricant above the design filled level (D-F) when the height (H) is filled with lubricant above the design filled level (D-F). That is, the head of lubricant may change in height depending on the filling rate and/or the level of lubricant in the volume (V) of the lubricant tank 2, and under gravity (G) this varying head of lubricant, when present, exerts a proportionally variable force on the valve 24. In this embodiment, the force exerted by the head of lubricant on the valve 24 acts against the biasing force (F). In this non-limiting embodiment, the height (H) of the filler tube 12 and the biasing force (F) of the valve 24 are selected so as to provide for functionality as it is described next.

As shown in FIG. 4, when the lubricant tank 2 is in the upright reference position (RP) and the height (H) of the filler tube 12 is filled with lubricant: if the lubricant level (LL) in the volume (V) is below the design filled level (D-F), the head of lubricant moves the valve 24 toward the open position 24A until at least some of the head of lubricant moves into the volume (V) by gravity (G). In this particular non-limiting embodiment, the valve 24 remains in the open position 24A until the lubricant level (LL) in the volume (V) reaches the design filled level (D-F). At that point, the valve 24 moves to the closed position 24B and prevents further addition of lubricant from the filler tube 12 into the volume (V). At this point, in at least some embodiments, the filling opening 16 and/or the diameter of the upper portion 12U of the filler tube 12 may be selected to be large enough for maintenance personnel to be able to observe a rise in the head of lubricant in the upper portion 12U.

Observing the rise may provide an indication that the lubricant level (LL) in the volume (V) has reached the design filled level (D-F). Accordingly, in the present embodiment and as shown in FIG. 5, when the lubricant tank 2 is in the upright reference position (RP) and the height (H) of the filler tube 12 is filled with lubricant: if the lubricant level (LL) in the volume (V) is at or above the design filled level (D-F), the valve 24 is in the closed position 24B. Referring to FIGS. 4 to 5, the lower portion 12L of the filler tube 12 defines a marginal flow opening 28 in the sidewall 12S of the lower portion 12L. The opening 28 provides a marginal fluid connection from the lower portion 12L into the volume (V) at or below the design empty level (D-E). In this embodiment, the marginal flow opening 28 opens into the volume (V) below the design empty level (D-E). Another possible location of the marginal flow opening 28, particularly at the design empty level (D-E), is shown in dashed lines and labeled 28A. Accordingly, the marginal flow opening 28 is located between the transfer opening 22 and the filling opening 16.

The marginal flow opening 28 is referred to as "marginal flow" due to its relative smaller size than the transfer opening 22. More particularly, in this embodiment, the marginal flow opening 28 is sized marginally large enough to counter the surface tension of the lubricant. This sizing allows for lubricant in the filler tube 12 to flow out of the filler tube 12 into the volume (V) through the marginal flow opening 28, if the lubricant level (LL) in the volume (V) is below the point at which the marginal flow opening 28 opens into the volume (V). If, on the other hand, the lubricant level (LL) in the volume (V) is at a given point in time above the point at which the marginal flow opening 28 opens into the volume (V) but below the initial level of lubricant in the filler tube 12, the marginal flow opening 28 may allow lubricant to flow out of the filler tube 12 until the level of lubricant in the filler tube 12 is equal to the lubricant level (LL) in the volume (V). This functionality may help improve the extent to which lubricant level in the filler tube 12 is representative of the lubricant level (LL) in the volume (V) while the valve 24 is in the closed position 24B. The marginal flow opening 28 is at the same time sized small enough relative to the transfer opening 22 so as to provide a sufficient flow restriction through the marginal flow opening 28 that would help provide the rise of lubricant level referred to above, and more particular to help make the rise observable to a person.

Further in the present embodiment, the lower portion 12L of the filler tube 12 defines therein a marginal flow opening 30 in the sidewall 12S of the lower portion 12L. The opening 30 provides a marginal fluid connection from the lower portion 12L into the volume (V) at or above the design filled level (D-F). In this embodiment, the marginal flow opening 30 opens into the volume (V) above the design filled level (D-F). Another possible location of the marginal flow opening 30, particularly at the design filled level (D-F), is shown in dashed lines and labeled 30A. Accordingly, the marginal flow opening 30 is located between the transfer opening 22 and the filling opening 16, and more particularly between the filling opening 16 and the marginal flow opening 28. Similar to the marginal flow opening 28, the marginal flow opening 30 is referred to as "marginal flow" due to its size, which is selected similarly to the size of the marginal flow opening 28 and therefore the particulars of the selection are not described again in detail. The marginal flow opening 30 helps improve the extent to which lubricant level in the filler tube 12 is representative of the lubricant level (LL) in the volume (V) while the valve 24 is in the closed position 24B.

Figure 7:
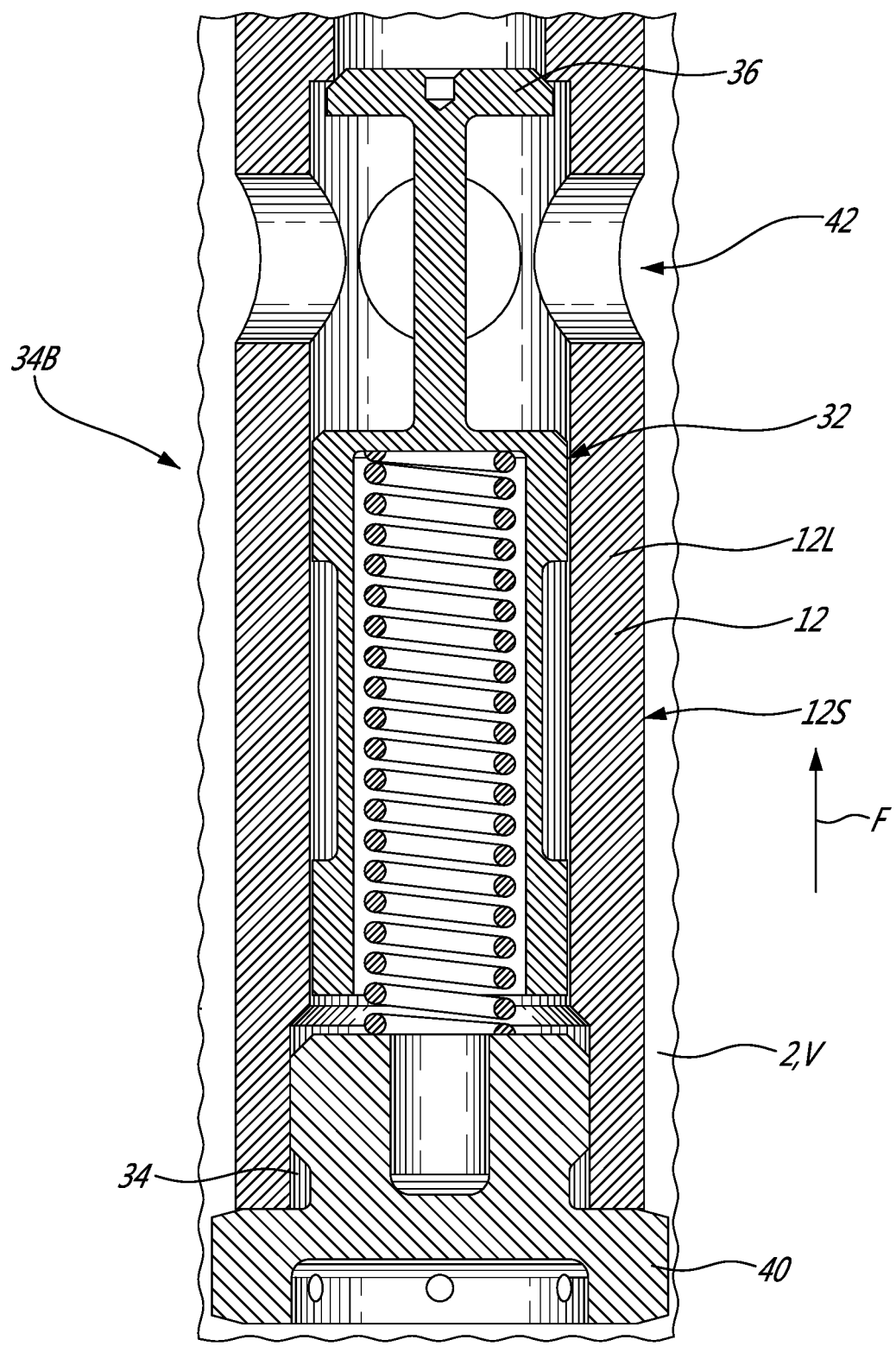
FIG. 7 is a schematic section view of a lower portion of the lubricant filler assembly and the lubricant tank of FIG. 3, the lubricant filler assembly including a check valve instead of the flapper valve, the check valve shown in a closed position.
Figure 8:
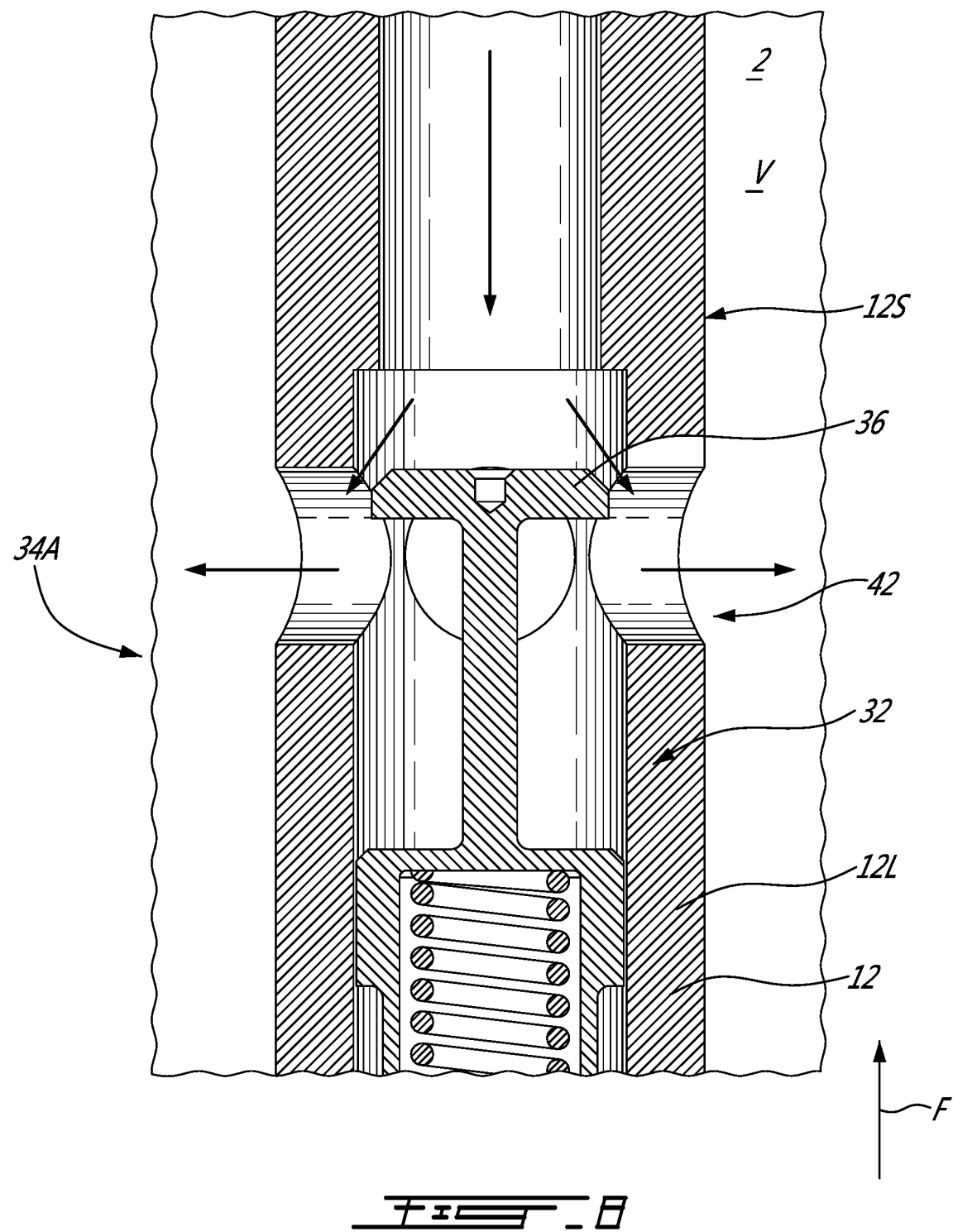
FIG. 8 is a schematic section view of the lower portion of the lubricant filler assembly of FIG. 7, with the check valve shown in an open position.

Referring to FIGS. 7 and 8, another embodiment of the valve 24 is shown. In this alternative embodiment, a check valve 32 is received at least in part in the bottom end the lower portion 12L of the filler tube 12, in this embodiment via an opening 34 in the bottom end. As shown in FIG. 7, the check valve 32 includes a piston 36 slidably received in the lower portion 12L of the filler tube 12, a compression spring 38 engaging the piston 36, and a plug 40 fixedly received in the opening 34 in the bottom end of the lower portion 12L. The plug 40 engages the spring 38 and fixes a bottom end thereof relative to the lower portion 12L of the filler tube 12. The piston 36 is slidable in the lower portion 12L between an open position 32A (FIG. 8) and a closed position 32B (FIG. 7). In the open position 32A, the piston 36 is disposed below a plurality of lubricant transfer openings 42 and provides a fluid connection from the interior of the upper portion 12U of the filler tube 12 to the interior of the lubricant tank 2 via the lubricant transfer openings 42. In the closed position 32B, the piston 36 is disposed above the lubricant transfer openings 42 and thus removes the fluid connection otherwise provided by the lubricant transfer openings 42 to the interior of the upper portion 12U of the filler tube 12. The spring 38 biases the piston 36 to the closed position 32B. The open position 32A and the closed position 32B of the piston 36 correspond to the open and closed positions of the valve 32, respectively.

In this embodiment, a biasing force F of the spring 38 is selected to provide the functionality of the flapper valve 24 and hence the lubricant filler assembly 10 as described above. These details are thus not repeated herein, to maintain clarity. As shown, in this embodiment, the lubricant transfer openings 42 are provided in a sidewall of the filler tube 12. The lubricant transfer openings 42 may be other shapes and/or sizes, and/or may be a single lubricant transfer opening 42. It is contemplated that different embodiments of the check valve 32 may be used, so long as the functionality described herein is provided.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in some embodiments, while this may not provide at least some of the advantages of the positioning described above, the marginal flow opening 28 may be proximate to but above the design empty level (D-E). Similarly, in some embodiments, while this may not provide at least some of the advantages of the positioning described above, the marginal flow opening 30 may be proximate to but below the design filled level (D-F). As another example, in some embodiments one of the openings 28, 30 may be omitted. As yet another example, in some embodiments, the opening 28 and/or 30 may be provided in a different number of openings. As yet another example, in some embodiments, the lubricant filler assembly 10 may have more than one valve, such as for example a combination of the flapper valve 24 and an embodiment of the check valve 32. As yet another example, in some embodiments, the upper portion 12U of the lubricant filler assembly 10 may be in part or wholly embedded into the lubricant tank 2 when in use. In some such embodiments, a corresponding wall of the lubricant tank 2 may have a sufficient thickness to accommodate at least a part of, or the whole, upper portion 12U. The dipstick could be replaced by any mean to determine the oil volume based on the level, including an electronic device (Oil level sensor, low oil level sensor). Yet further modifications could be implemented by a person of ordinary skill in the art in view of the present disclosure, which modifications would be within the scope of the present technology.

The invention claimed is:

1. A lubricant filler assembly for a lubricant tank for an aircraft engine, the lubricant tank having a volume associated with a design filled level and a design empty level, the lubricant filler assembly comprising:
    a filler tube having an upper portion to be disposed outside the volume when the lubricant filler assembly is attached to the lubricant tank, a lower portion to be disposed inside the volume when the lubricant filler assembly is attached to the lubricant tank, a first opening in the upper portion, and a second opening in the lower portion, wherein a height of the filler tube extending above the design filled level is selected to provide a head of lubricant when the height is filled with lubricant;
    an oil volume sensor removably received in the filler tube through the first opening in an in-use position and extending into the lower portion while in the in-use position;
    a valve operatively connected to the filler tube and movable between an open position in which the valve provides a fluid connection into the lower portion via the second opening, and a closed position in which the valve blocks the fluid connection into the lower portion via the second opening, the valve biased to the closed position with a biasing force, wherein the biasing force and the height are selected such that when the lubricant tank is in an upright reference position and the height of the filler tube is filled with lubricant:
        a) if a lubricant level in the volume is below the design filled level, the head of lubricant moves the valve toward the open position until at least some of the head of lubricant moves into the volume by gravity, and
        b) if the lubricant level in the volume is at or above the design filled level, the valve is in the closed position;
    a third opening, the third opening being smaller than both the first opening and the second opening and defined one of:
        a) through a sidewall of the lower portion of the filler tube to provide a fluid connection between the volume and the lower portion when the lubricant filler assembly is attached to the lubricant tank, and
        b) through the valve to provide the fluid connection when the lubricant filler assembly is attached to the lubricant tank.

2. The lubricant filler assembly of claim 1, further comprising a fourth opening defined in the lower portion of the filler tube, the fourth opening being spaced away from the third opening relative to a height of the lower portion.

3. The lubricant filler assembly of claim 2, wherein:
    the oil volume sensor comprises a dipstick having a lubricant level test zone on the dipstick; and
    the lubricant level test zone is between the third opening and the fourth opening when the dipstick is in the in-use position.

4. The lubricant filler assembly of claim 3, wherein the third opening is defined through the sidewall of the lower portion.

5. The lubricant filler assembly of claim 3, wherein:
    the first opening is defined in a top end of the upper portion;
    the lubricant filler assembly includes a cap removably engaged to the top end and sealing the first opening; and
    the dipstick is attached to the cap.

6. The lubricant filler assembly of claim 3, wherein each of the third opening and the fourth opening is a marginal flow opening.

7. The lubricant filler assembly of claim 3, wherein the filler tube includes a securement feature disposed at least in part between the upper portion and the lower portion.

8. The lubricant filler assembly of claim 1, wherein the valve is a check-valve.

9. The lubricant filler assembly of claim 1, wherein the second opening is defined in a bottom end of the lower portion.

10. The lubricant filler assembly of claim 9, wherein the valve is a flapper valve attached to the bottom end and covers the second opening when in the closed position.

11. The lubricant filler assembly of claim 1, wherein the valve is a normally-closed valve.

12. A lubricant tank for an aircraft, comprising:
    a wall defining at least part of a volume of the lubricant tank, the volume being associated with a design filled level and a design empty level;
    a fluid connection into the volume;
    a filler tube having an open top end portion disposed outside of the volume and accessible from outside of the lubricant tank, and a lower portion disposed inside the volume and extending below the design empty level when the lubricant tank is in an upright reference position, the filler tube having a larger opening and a smaller opening in the lower portion, wherein a height of the filler tube extending above the design filled level is selected to provide a head of lubricant when the height is filled with lubricant;

an oil volume sensor removably received in an in-use position in the lower portion through the open top end portion and having a lubricant level test zone extending between the design filled level and the design empty level while the oil volume sensor is in the in-use position; and a normally-closed valve operatively connected to the filler tube and movable between an open position in which the valve exposes at least part of the larger opening and a closed position in which the valve blocks the larger opening, the normally-closed valve biased to the closed position with a biasing force, wherein the biasing force and the height are selected such that when the lubricant tank is in the upright reference position and the height of the filler tube is filled with lubricant:
  a) if the lubricant level in the volume is below the design filled level, the head of the lubricant moves the normally-closed valve toward the open position until at least some of the head of lubricant moves into the volume by gravity, and
  b) if the lubricant level in the volume is at or above the design filled level, the normally-closed valve is in the closed position.

13. The lubricant tank of claim 12, wherein the smaller opening is a marginal flow opening that opens into the volume at a location proximate to or below the design empty level.

14. The lubricant tank of claim 12, further comprising a second marginal gravity flow opening defined in the filler tube and opening into the volume at a location proximate to or above the design filled level.

15. The lubricant tank of claim 14, wherein the valve is a check-valve.

16. The lubricant tank of claim 15, wherein the lubricant level test zone extends above the design filled level and below the design empty level when the oil volume sensor is in the in-use position.

17. The lubricant tank of claim 12, wherein the design filled level is below a top of the volume of the lubricant tank and the design empty level is above a bottom of the volume of the lubricant tank.

* * * * *